United States Patent [19]
Pugh

[11] Patent Number: 5,770,074
[45] Date of Patent: Jun. 23, 1998

[54] FILTER APPARATUS

[75] Inventor: Jeffrey R. Pugh, Potters Bar, England

[73] Assignee: Brasilia (UK) Limited, London, England

[21] Appl. No.: 750,514

[22] PCT Filed: Jun. 1, 1995

[86] PCT No.: PCT/GB95/01255

§ 371 Date: Dec. 5, 1996

§ 102(e) Date: Dec. 5, 1996

[87] PCT Pub. No.: WO95/33399

PCT Pub. Date: Dec. 14, 1995

[30] Foreign Application Priority Data

Jun. 6, 1994 [GB] United Kingdom .................... 9411268

[51] Int. Cl.⁶ ..................................................... B01D 33/01
[52] U.S. Cl. ........................... 210/474; 210/477; 210/480; 210/482; 99/297
[58] Field of Search ..................................... 210/474, 477, 210/478, 480, 481, 482; 99/295, 297

[56] References Cited

U.S. PATENT DOCUMENTS 2,935,928  5/1960  Keating et al. .
4,733,792  3/1988  Wasserman .
4,764,391  8/1988  Wasserman .
4,821,630  4/1989  Roberts .

FOREIGN PATENT DOCUMENTS 011 0 617   6/1984   European Pat. Off. .
167 423     1/1986   European Pat. Off. .
2 300 532   9/1976   France .
2 508 785   1/1983   France .
90 12 236  10/1990   Germany .
9 001 463   1/1992   Netherlands .
354 911     7/1961   Switzerland .
2 104 400   3/1983   United Kingdom .

Primary Examiner—W. L. Walker
Attorney, Agent, or Firm—Cushman Darby & Cushman IP Group of Pillsbury Madison & Sutro LLP

[57] ABSTRACT

The invention provides for filter apparatus comprising a receptacle for liquid to be filtered and having outlet means by which filtered liquid can be dispensed therefrom, plunger means having filter means and arranged for movement within said receptacle and through said liquid so as to filter said liquid, said plunger means being provided with a skirt portion for contacting the inner surface of said receptacle during said movement of said plunger within said receptacle, and wherein said skirt portion is arranged to extend away from said filter means and in the direction of movement of said plunger means during the filtering of said liquid, said skirt means being arranged to be biased towards the inner surface of said receptacle by the pressure of the liquid being filtered during said movement.

13 Claims, 2 Drawing Sheets

FILTER APPARATUS

This application is the national phase of international application PCT/GB95/01255, filed Jun. 1, 1995 which designated the U.S.

The present invention relates to filter apparatus and in particular, but not exclusively, to filter apparatus for the preparation of beverages such as coffee.

There is currently known a variety of methods of preparing a beverage such as coffee. One of the most common methods involves the use of a receptacle into which hot water and coffee are introduced. Then, at the appropriate time, a plunger is inserted into the receptacle and pushed downwardly through the liquid in the receptacle from an upper opening of the receptacle to a base region of the receptacle. The plunger includes a plunger head which has a filter element and this serves to filter the liquid during the movement of the plunger downwardly within the receptacle. This downward movement of the plunger, with its associated filter element, seeks to collect, and retain, coffee grinds and other solid particles that should be kept separate from the beverage to be eventually dispensed.

Such known apparatus is however disadvantageous in that the plunger does not successfully prevent the passage of coffee grinds, and other material, into the region of the receptacle from which the beverage is eventually dispensed. In particular, as the plunger is moved downwardly within the receptacle, the build-up of pressure in the liquid below the downwardly moving plunger serves to open an access path for coffee grinds and other material to by-pass the plunger, i.e. pass through a gap formed between the outer periphery of the plunger and the inner surface of the receptacle.

This is particularly disadvantageous in that it provides for a potentially poor-quality beverage having coffee grinds and possibly other solid material present therein. Further, the passage of the coffee grinds and other material, via the gap formed between the outer periphery of the plunger and the inner wall of the receptacle, also serves to scratch and disadvantageously spoil the appearance of the inner surface of the receptacle so that the receptacle quite readily takes on the appearance of a well-used, old and generally unclean receptacle.

Metal filter plunger members are commonly known but are restricted in their use since it is generally not feasible to use such filter plunger members with polycarbonate beakers which tend to exhibit a decrease in internal diameter with depth.

The present invention seeks to provide filter apparatus having advantages over currently available filter apparatus.

According to one aspect of the present invention there is provided filter apparatus comprising a receptacle for liquid to be filtered and having outlet means by which filtered liquid can be dispensed therefrom, plunger means having filter means and arranged for movement within said receptacle and through said liquid so as to filter said liquid, said plunger means being provided with a skirt portion for contacting the inner surface of said receptacle during said movement of said plunger within said receptacle, and wherein said skirt portion is arranged to extend away from said filter means and in the direction of movement of said plunger means during the filtering of said liquid, and to be biased towards the inner surface of said receptacle by the pressure of the liquid being filtered during said movement.

The invention is particularly advantageous in that, as the plunger is moved through the liquid so as to effect the filtering action, the liquid being filtered can act so as to force the skirt region of the plunger outwardly and into contact with the inner surface of the receptacle and this advantageously assists in seeking to greatly inhibit the passage of any solid material past the outer periphery of the plunger means. The improved sealing between the plunger means and the inner surface of the receptacle advantageously substantially reduces the amount of solid product found in the filtered liquid.

Advantageously, said skirt portion is arranged to flair outwardly from the filter means during said movement of said plunger means through said liquid.

The skirt portion can then be arranged to be formed from an appropriate material to allow for such flaring-out so as to assist in providing a high quality seal between the outer periphery of the plunger means and the inner surface of said receptacle.

Preferably, said skirt means is provided with a plurality of lines of weakness so as to assist in the biasing thereof towards the inner surface of said receptacle.

In one particular embodiment, said lines of weakness comprise a plurality of slits formed in said skirt portion.

Preferably, said slits extend from the edge of said skirt means remote from said filter means and serve to provide a plurality of tongue portions on said skirt portion.

Advantageously, each of said plurality of tongue portions is arranged to be biased towards the inner surface of said receptacle so as to provide for the improved sealing achieved by the present invention. Such biasing is readily achieved by virtue of the pressure of the liquid within the skirt portion.

In particular, each of the tongue portions is arranged to have substantially the same dimensions.

Further, each of said slits can be arranged to extend for the same distance into said skirt portion. Preferably, each of said slits extends for substantially half the height of said skirt portion.

Preferably, said skirt portion is formed from a glass-based resin. Such a material is particularly advantageous in providing for a skirt portion which can be readily biassed in the appropriate manner by virtue of the pressure of the liquid being filtered. One example of an advantageous material is glass-filled polypropylene.

Materials of the above-mentioned type exhibit advantageous characteristics as regards flexibility and resilience.

In particular, the apparatus of the present invention can comprise a receptacle which is arranged to dispense a filtered beverage. As such, the invention can advantageously comprise a plunge-filter beverage maker such as a plunge-filter coffee maker or plunge-filter tea maker.

By way of a further advantage, said apparatus can be arranged with a lid portion having an aperture through which a shaft of said plunger means extends and by virtue of which said shaft member is guided during said movement of said plunger means and which said lid is arranged for forming a snap-fit with an opening of said receptacle.

Such a feature provides for further improved filtering of the liquid in that the snap-fitment of said lid provides for stable guide means for the passage of the plunger shaft and thus for the plunger means itself.

According to another aspect of the present invention there is provided a plunger having a filter means for the filtering of a liquid during movement of said plunger through said liquid wherein said plunger means is provided with a skirt portion for contacting the inner surface of a receptacle containing said liquid and which skirt means extends away from said filter means in a direction of intended movement of said plunger during filtering of said liquid, and wherein said skirt portion is arranged to be biased towards the inner surface of said receptacle by pressure of the liquid being filtered during said movement.

Preferably, said skirt means is provided with a plurality of lines of weakness so as to assist in the biasing thereof towards the inner surface of said receptacle.

In one particular embodiment, said lines of weakness comprise a plurality of slits formed in said skirt portion.

Preferably, said slits extend from the edge of said skirt means remote from said filter means and serve to provide a plurality of tongue portions on said skirt portion.

Advantageously, each of said plurality of tongue portions is arranged to be biased towards the inner surface of said receptacle so as to provide for the improved sealing achieved by the present invention. Such biasing can be readily achieved by virtue of the pressure of the liquid within the skirt portion.

In particular, each of the tongue portions is arranged to have substantially the same dimensions.

Further, each of said slits can be arranged to extend for the same distance into said skirt portion. Preferably, each of said slits extends for substantially half the height of said skirt portion.

Preferably, said skirt portion is formed from a glass-based resin. Such a material is particularly advantageous in providing for a skirt portion which can be readily biassed in the appropriate manner by virtue of the pressure of the liquid being filtered. One example of an advantageous material is glass-filled polypropylene.

According to yet a further aspect of the present invention there is provided filter apparatus comprising a receptacle for receiving liquid to be filtered and arranged to receive a plunger with filter means to be moved therethrough so as to effect said filtering, wherein said apparatus includes a lid member having an aperture for guiding a shaft member associated with said plunger, wherein said lid member is arranged for snap-fit engagement with said receptacle.

The snap-fitment of the lid with the receptacle is particularly advantageous in improving the accuracy of the passage of the plunger through the receptacle and liquid and thereby improving the filtering of the liquid.

As will be appreciated each of the aspects of the present invention can readily relate to a plunger-filter coffee or tea maker, or a plunger therefor.

The present invention is described further hereinafter, by way of example only, with reference to the accompanying drawings in which.

Figure 1:
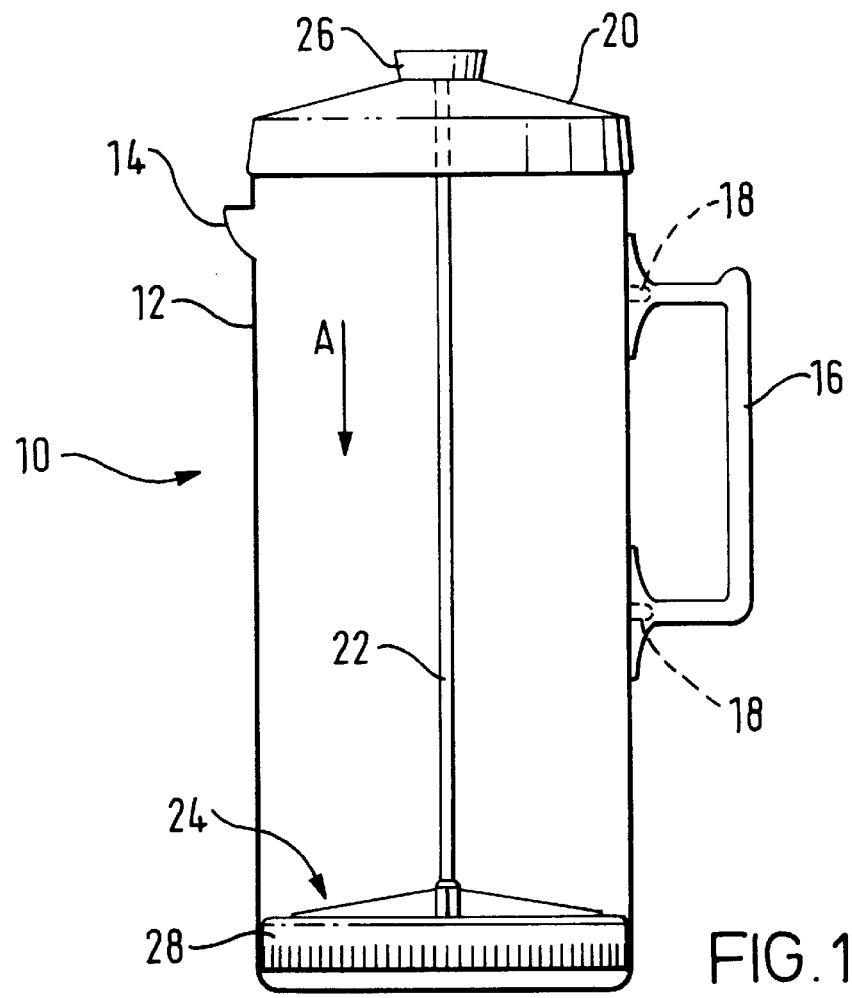
FIG. 1 is a side elevational view of filter apparatus embodying the present invention.

The illustrated embodiment of the present invention comprises a plunge-filter coffee maker 10 having a beaker 12 formed of polycarbonate. Coffee is formed in the beaker by the mixture of hot water and ground coffee therein and, when appropriate, can be dispensed by way of a spout 14. The handle 16 is rigidly connected to the beaker 12 by way of lugs 18 which extend outwardly from the outer surface of the beaker 12. According to one particular advantage of the illustrated embodiment, the handle 16 is formed from a material which, when cooling, is arranged to shrink-fit around the lugs 18. The coffee maker 10 also includes a lid 20 which is arranged to snap-fit onto the upper periphery of the beaker 12 and is provided with a central bore through which a shaft 22 of a plunger extends for guidance therethrough. At the lower end of the shaft 22 as illustrated in the drawings, there is provided a plunger head 24 and the upper end there is provided a button handle 26.

Once the ground coffee and hot water mixture has been provided in the beaker 12, a lid 20 can be fitted onto the upper periphery of the beaker 12 and the button handle 26 of the plunger can be moved downwardly so as to move the plunger 24 from a position adjacent the lid 20, and in the direction of arrow A in FIG. 1, downwardly through the hot water and ground coffee mixture so as to provide for filtered coffee in the region above the plunger head 24 which can then be dispensed by way of the spout 14.

The plunger head 24 includes a skirt portion 28 around the periphery thereof and which is arranged to extend away from a filter element (not shown in FIG. 1) mounted in the plunger head 24 and in the direction of movement of the plunger head during the filtering action. Thus, in the embodiment illustrated in FIG. 1, the skirt means 28 is arranged to depend downwardly from the filter element (not shown in FIG. 1).

Figure 2:
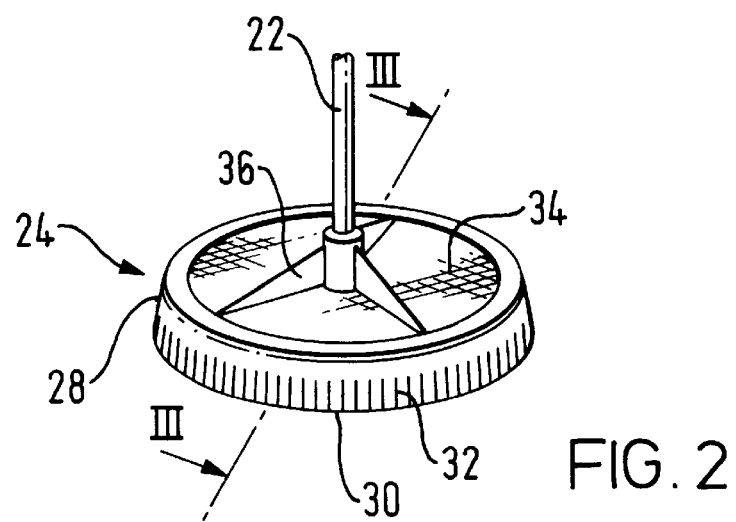
FIG. 2 is a perspective view of the plunger head of the apparatus of FIG. 1.

The structure of the plunger 24 is shown in greater detail in FIG. 2. As can be seen, the plunger head 24 is circular in form and has a shallow cylindrical portion extending downwardly to form the aforementioned skirt portion 28. The skirt portion 28 is provided with a plurality slits 32 which extend upwardly from the lower surface of the skirt portion 28 and for a distance which is substantially all to half the height of the skirt portion 28. The plurality of slits 32 serve to define a plurality of adjacent tongue portions 30 which are arranged for hinged movement relative to the upper portion of the skirt portion.

Further, a flat circular filter element 34 is provided in the plunger head 24 so as to provide for the filtering of the hot water and ground coffee mixture during the downward movement of the plunger head 24 in the direction of arrow A of FIG. 1. As can also be seen in FIG. 2, the shaft 22 is received in its central mounting portion of the plunger head 24 from which said central mounting portion 3 support ribs 36 extend in a radial manner. The support ribs 36 extends so as to provide support for the filter element 34 and extend between the central mounting portion of the plunger head 24 to receive the shaft 22 and an outer annular portion of the plunger 24 from which the skirt portion 28 depends.

Figure 3:
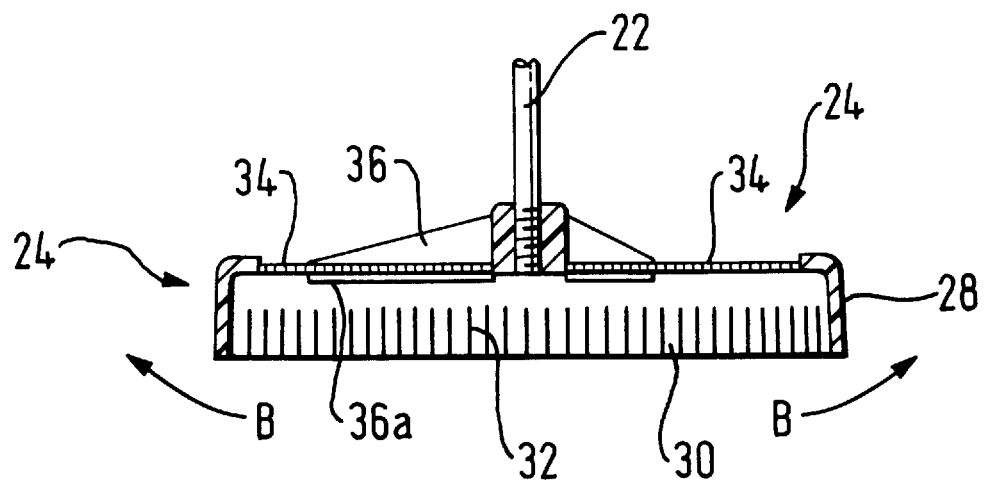
FIG. 3 is a cross-sectional view along the lines III—III of FIG. 2.

FIG. 3 shows a cross-section of the plunger head 24 of FIG. 2 taken along the lines III—III. As can be appreciated, the radially extending support ribs 36 extend through the filter element 34 so that a lower portion 36a of each rib extends below the filter element 34.

The function of the plunger head 24 of the illustrated embodiment of the present invention is now described with particular reference to FIG. 3. As mentioned above, in order to form the filtered coffee, the plunger head 24 is moved downwardly through the hot water and ground coffee mixture in the beaker 12 and in the direction of arrow A in FIG. 1. During such movement, there is a build up of pressure in the hot water ground coffee mixture below the plunger head 24 which serves to resist movement of the plunger head 24 in the direction of arrow A. It is a particular feature of the present invention that the configuration of the plunger head 24 is provided so as to benefit from such a build up of pressure in order to improve the sealing of the peripheral portion of the plunger head 24 with the inner surface of the beaker 12. Such an improved sealing is particularly required so as to prevent the passage of coffee grinds, and other undesired material, into the coffee that is to be dispensed by way or the spout 14. The aforementioned sealing can be advantageously achieved with the present invention without the need for any biasing means such as a spring member commonly found in known beakers.

As will be appreciated from FIG. 3, during the movement of the plunger head 24 in the direction arrow A, and during the subsequent build up of pressure below the plunger head 24, the water located below the plunger head 24 serves to bias the downwardly depending skirt portion 28 in a direction towards the inner surface of the beaker 12, that is, in the direction of arrows B shown in FIG. 3. In view of the particular structure of the skirt portion 28 of the illustrated embodiment, the aforementioned increase in the water pressure serves to deflect substantially all of the tongue portions 30 towards, and into sealing engagement with, the inner surface of the beaker 12.

The improved sealing between the outer periphery of the plunger head 24 and the inner surface of the beaker 12 as provided by the illustrated embodiment of the present invention, is particularly advantageous in serving to inhibit the passage of coffee grinds and other unwanted material into the coffee to be dispensed. Also, the plunger head 24 serves to reduce the likelihood of the inner surface of the beaker 12 becoming scratched or otherwise spoilt by coffee grinds or other material that, in known coffee makers, can become trapped between the outer portion of the plunger head and the inner surface of the beaker during the movement of the plunger.

A further advantage for providing the sealing between the outer periphery of the plunger head 24 and the inner surface of the beaker 12 arises from the slight narrowing of the beaker 12 towards the bottom thereof. Thus, the diameter of the beaker 12 is slightly greater at the top portion adjacent to the lid 20 than it is at the base portion. Such narrowing can be readily provided in a beaker 12 formed by an injection moulding process and the skirt portion 28 can advantageously follow any variation in diameter of the beaker without detriment to the aforementioned sealing feature. Also, the skirt portion 28 is advantageously arranged to return to its larger diameter once immersed in suitably hot water. Then, if the skirt becomes deformed due to continued use, or otherwise, it can be returned to its original diameter by thermally activating its memory characteristics which allow for its return to its original diameter.

Figure 4:
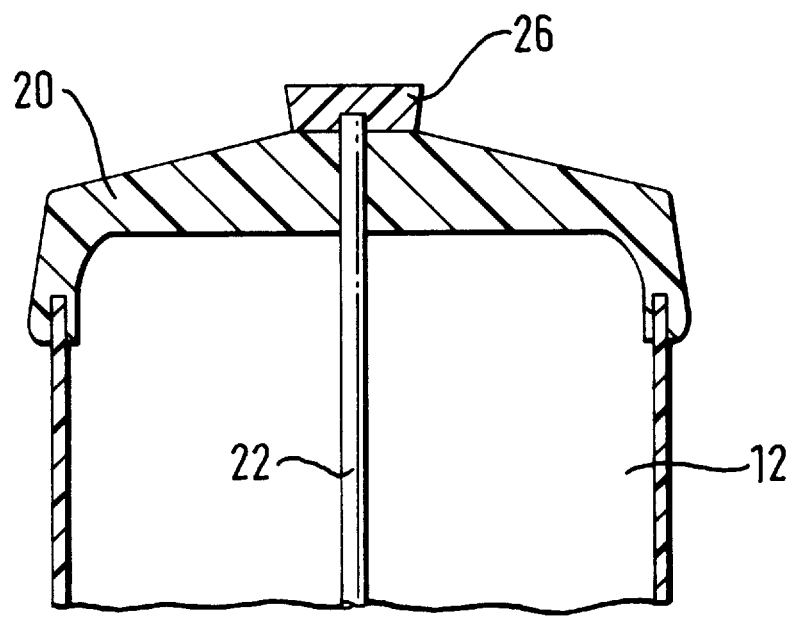
FIG. 4 is a cross-sectional view of the lid and upper part of the beaker of the apparatus illustrated in FIG. 1.

A further aspect of the present invention is now described by way of particular reference to FIG. 4. FIG. 4 is a cross-section through the lid 20 and upper portions of the beaker 12 shown in FIG. 1 from which it can be clearly seen that the lid 20 is arranged to snap-fit onto the upper periphery wall of the beaker 12. Such snap-fitment, particularly when the beaker is formed of glass-filled resin, proves advantageous in providing for a secure mounting of the plunger shaft 22 within the coffee maker 10. The snap-fitment of the lid 20 onto the beaker 12 provides for particular stability between the lid 20 and the beaker 12 and thereby provides for particular stability in the location of a guide bore extending upwardly through the central portion of the lid 20 and through which the shaft 22 of the plunger extends. The present invention is therefore advantageous in ensuring that, once the lid 20 is snap-fitted to the beaker 12, the shaft 22, and thus the plunger itself, can be accurately directed in a manner such that the shaft 22 extends along in a direction parallel to the longitudinal axis of the beaker 12 and that the plane of the filter element 34 and the transverse portion of the plunger head 24 is substantially perpendicular to the wall of the beaker 12. The sealing between the outer periphery of the plunger head 24 and the inner surface of the beaker 12 can thereby be particularly enhanced by the snap-fitment of the lid 20 to the beaker 12.

The invention is not restricted to the details of the foregoing embodiments. For example, the filter apparatus of the present invention can be incorporated into any nature of beaker requiring a filter plunger to move therethrough so as to effect filtration of liquid. In particular, the invention can be incorporated into any form of plunge-filter apparatus for preparing beverages. Also, the configuration of the plunger head is not restricted to the details of the foregoing embodiment in that any appropriate form of skirt portion 28 can be provided so long as it extends in a direction of movement of the plunger head and that can be biased into engagement with the inner surface of the beaker by way of the increase in liquid pressure that occurs in the liquid to be filtered.

It will be appreciated that other modifications and variations may be made to the embodiment described and illustrated within the scope of the present application.

I claim:

1. Filter apparatus comprising a receptacle for liquid to be filtered, the receptacle having an outlet from which filtered liquid can be dispensed, and a plunger movable downwardly within said receptacle and through the liquid, the plunger having filter means arranged to filter said liquid during the downward, filtering movement of the plunger, said plunger having a cylindrical skirt portion in contact with the inner surface of said receptacle, wherein said skirt portion depends downwardly from said filter means in the direction of the filtering movement of said plunger, said skirt portion being arranged to be biased towards the inner surface of said receptacle by the pressure of the liquid being filtered during said filtering movement, and wherein said skirt portion of said plunger has thermally activated memory characteristics enabling the skirt portion to be returned to its original diameter.

2. Filter apparatus as claimed in claim 1, wherein said receptacle is formed of polycarbonate.

3. Filter apparatus as claimed in claim 1 or 2, wherein said skirt portion has a plurality of lines of weakness so as to assist in the biasing thereof towards the inner surface of said receptacle.

4. Filter apparatus as claimed in claim 3, wherein said lines of weakness comprise a plurality of slits formed in said skirt portion.

5. Filter apparatus as claimed in claim 4, wherein said slits extend from the edge of said skirt portion remote from said filter means and define a plurality of tongue portions on said skirt portion.

6. Filter apparatus as claimed in claim 5, wherein each of said tongue portions has substantially the same dimensions.

7. Filter apparatus as claimed in claim 4, wherein each of said slits extends for the same distance into said skirt portion.

8. Filter apparatus as claimed in claim 1, wherein said skirt portion is formed from a glass-based resin.

9. Filter apparatus as claimed in claim 8, wherein said glass-based resin comprises glass-filled polypropylene.

10. Filter apparatus as claimed in claim 1, and further comprising a lid having an aperture through which a shaft of said plunger extends and by virtue of which said shaft is guided during the filtering movement of said plunger.

11. Filter apparatus as claimed in claim 10, wherein said lid forms a snap-fit with an opening of said receptacle.

12. A plunger for a filter apparatus, said plunger having filter means for the filtering of a liquid during filtering movement of the plunger through said liquid, wherein said plunger has a cylindrical skirt portion for contacting an inner surface of a receptacle containing the liquid to be filtered, said skirt portion extending away from said filter means in a direction of intended movement of said plunger during filtering of said liquid, wherein said skirt portion is arranged to be biased towards the inner surface of said receptacle by pressure of the liquid being filtered during said filtering movement, and wherein said skirt portion of said plunger has thermally activated memory characteristics enabling the skirt portion to be returned to its original diameter.

13. A plunger as claimed in claim 12, wherein said skirt portion comprises a plurality of slits formed therein, each said slit extending from the edge of said skirt portion remove from said filter means and defining a plurality of tongue portions on said skirt portion.

* * * * *